(12) United States Patent
Jeon et al.

(10) Patent No.: US 7,859,616 B2
(45) Date of Patent: *Dec. 28, 2010

(54) LIQUID CRYSTAL DISPLAY APPARATUS

(75) Inventors: Jin Jeon, Anyang-si (KR); Won-Kyu Lee, Seoul (KR); Jun-Ho Song, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/039,121

(22) Filed: Feb. 28, 2008

(65) Prior Publication Data
US 2008/0143938 A1  Jun. 19, 2008

Related U.S. Application Data

(63) Continuation-in-part of application No. 10/854,850, filed on May 27, 2004, now Pat. No. 7,372,528.

(30) Foreign Application Priority Data

Jun. 9, 2003   (KR) ................. 10-2003-0036810
Sep. 25, 2003  (KR) ................. 10-2003-0066541

(51) Int. Cl.
*G02F 1/1333* (2006.01)
(52) U.S. Cl. .................. 349/111; 349/38; 349/110; 349/139
(58) Field of Classification Search ............. 349/111, 349/110, 139
See application file for complete search history.

(56) References Cited

U.S. PATENT DOCUMENTS

| 5,781,254 | A | 7/1998 | Kim et al. | |
| 5,926,702 | A | 7/1999 | Kwon et al. | |
| 5,956,103 | A | 9/1999 | Ishiguro | |
| 6,023,309 | A | 2/2000 | Gogna et al. | |
| 6,259,200 | B1 * | 7/2001 | Morita et al. | 313/498 |
| 6,525,788 | B1 | 2/2003 | Nakagawa et al. | |
| 6,559,904 | B1 * | 5/2003 | Kwak et al. | 349/43 |

(Continued)

FOREIGN PATENT DOCUMENTS

| JP | 2001-337349 A | 12/2001 |
| JP | 2002-151699 A | 5/2002 |
| KR | 1020000007896 A | 2/2000 |
| KR | 1020010057017 A | 7/2001 |

OTHER PUBLICATIONS

Chinese Office Action and English translation thereof for Application No. 200410049393 1 dated Jul. 27, 2007.

*Primary Examiner*—Richard H Kim
(74) *Attorney, Agent, or Firm*—Cantor Colburn LLP

(57) ABSTRACT

A liquid crystal display apparatus includes an array substrate, a color filter substrate and a liquid crystal layer. The array substrate includes a transparent substrate, a plurality of pixel electrodes, a plurality of switching devices, a data line, a gate line and a light blocking pattern. The light blocking pattern is disposed on the transparent substrate. The light blocking pattern overlaps with at least a portion of the pixel electrodes neighboring each other and at least a portion of the data line. The light blocking pattern is disposed between the data line and the transparent substrate.

18 Claims, 8 Drawing Sheets

U.S. PATENT DOCUMENTS

| | | |
|---|---|---|
| 6,760,081 B2 * | 7/2004 | Takagi .......................... 349/38 |
| 7,372,528 B2 * | 5/2008 | Jeon et al. ................... 349/110 |
| 2001/0046003 A1 | 11/2001 | Song |
| 2003/0147020 A1 * | 8/2003 | Takahashi et al. ............. 349/43 |
| 2004/0135939 A1 | 7/2004 | Luo |
| 2005/0041169 A1 * | 2/2005 | Hashimoto et al. ............ 349/43 |

* cited by examiner

LIQUID CRYSTAL DISPLAY APPARATUS

CROSS-REFERENCE TO RELATED APPLICATIONS

This is a continuation-in-part of U.S. patent application Ser. No. 10/854,850, filed on May 27, 2004, the entire contents of which are incorporated herein by reference.

This application claims priority to Korean Patent Application No. 2003-36810 filed on Jun. 9, 2003 and Korean Patent Application No. 2003-66541 filed on Sep. 25, 2003 and all the benefits accruing therefrom under 35 U.S.C §119, and the contents of which in its entirety are herein incorporated by reference.

BACKGROUND OF THE INVENTION

1. Field of the Invention

The present invention relates to a liquid crystal display apparatus. More particularly, the present invention relates to a liquid crystal display apparatus having an enhanced opening ratio and reducing a parasitic capacitance.

2. Description of the Related Art

A liquid crystal display apparatus displays images by using liquid crystal. The liquid crystal display apparatus possesses many merits such as thin thickness, lightweight, etc. Therefore, the liquid crystal display apparatus has been widely used.

The liquid crystal display apparatus includes a liquid crystal display panel and a backlight assembly. The backlight assembly is disposed under the liquid crystal display panel to provide the liquid crystal display panel with a light.

The liquid crystal display panel includes a color filter substrate, an array substrate and a liquid crystal layer interposed between the color filter substrate and the array substrate. The color filter substrate includes color filters including a red color filter, a green color filter and a blue color filter. The color filters are arranged in a matrix shape. The color filters filter a light that passes through a pixel electrode to transmit the light having a specific wavelength. Hereinafter, a conventional array substrate will be explained.

A conventional array substrate includes a thin film transistor, a storage electrode and a pixel electrode. The thin film transistor, the storage electrode and the pixel electrode are opposite to a color filter of a color filter substrate.

The array substrate further includes a data line and a gate line. The data line and the gate line are disposed between the color filters, and the data line and the gate line are extended along a region between the color filters.

The data line is electrically connected to a source electrode of the thin film transistor, and the gate line is electrically connected to a gate electrode of the thin film transistor. A drain electrode of the thin film transistor is electrically connected to the pixel electrode.

The storage electrode supports a liquid crystal capacitor formed by the pixel electrode, the liquid crystal layer and the common electrode to maintain the data voltage. When a data voltage is applied to the pixel electrode, the storage electrode prevents variation of the data voltage. The storage electrode may be formed at edge portion of the pixel electrode.

Furthermore, a light blocking layer (or black matrix) is formed at the color filter substrate in order to prevent light from being leaked through an opening between the data line and the light blocking pattern.

The light blocking layer is formed on the color filter substrate, and a liquid crystal display apparatus is formed by assembling the color filter substrate and the array substrate. Therefore, even a minute misalignment may induce the light leakage. When a width of margin of the light blocking layer is increased in order to compensate the misalignment, the aperture ratio is also lowered.

SUMMARY OF THE INVENTION

The present invention provides a liquid crystal display apparatus having an enhanced opening ratio and reducing a parasitic capacitance.

In an example embodiment of the present invention, a liquid crystal display apparatus includes an array substrate, a color filter substrate having a plurality of color filters and a liquid crystal layer interposed between the array substrate and the color filter substrate. The array substrate includes a transparent substrate, a plurality of pixel electrodes, a plurality of switching devices, a data line, a gate line and a light blocking pattern. The pixel electrodes are arranged in a matrix shape. The switching devices include gate, drain and source electrodes. The drain electrodes of the switching devices are electrically connected to the pixel electrodes, respectively. The data line is disposed under a region between the pixel electrodes. The data line is electrically connected to the source electrode. The gate line is electrically connected to the gate electrode to turn on/off the switching devices. The light blocking pattern is disposed on the transparent substrate. The light blocking pattern overlaps with at least a portion of the pixel electrodes neighboring each other and at least a portion of the data line. The light blocking pattern is disposed between the data line and the transparent substrate.

According to the present invention, the light blocking pattern prevents a light leakage. Furthermore, the light blocking pattern is formed on a substrate on which the pixel electrode is formed. Therefore, a margin for misalignment between the color filter substrate and the array substrate is not required to enhance an aperture ratio.

BRIEF DESCRIPTION OF THE DRAWINGS

The above and other features and advantage points of the present invention will become more apparent by describing in detailed example embodiments thereof with reference to the accompanying drawings, in which.

DESCRIPTION OF PREFERRED EMBODIMENTS

Figure 1:
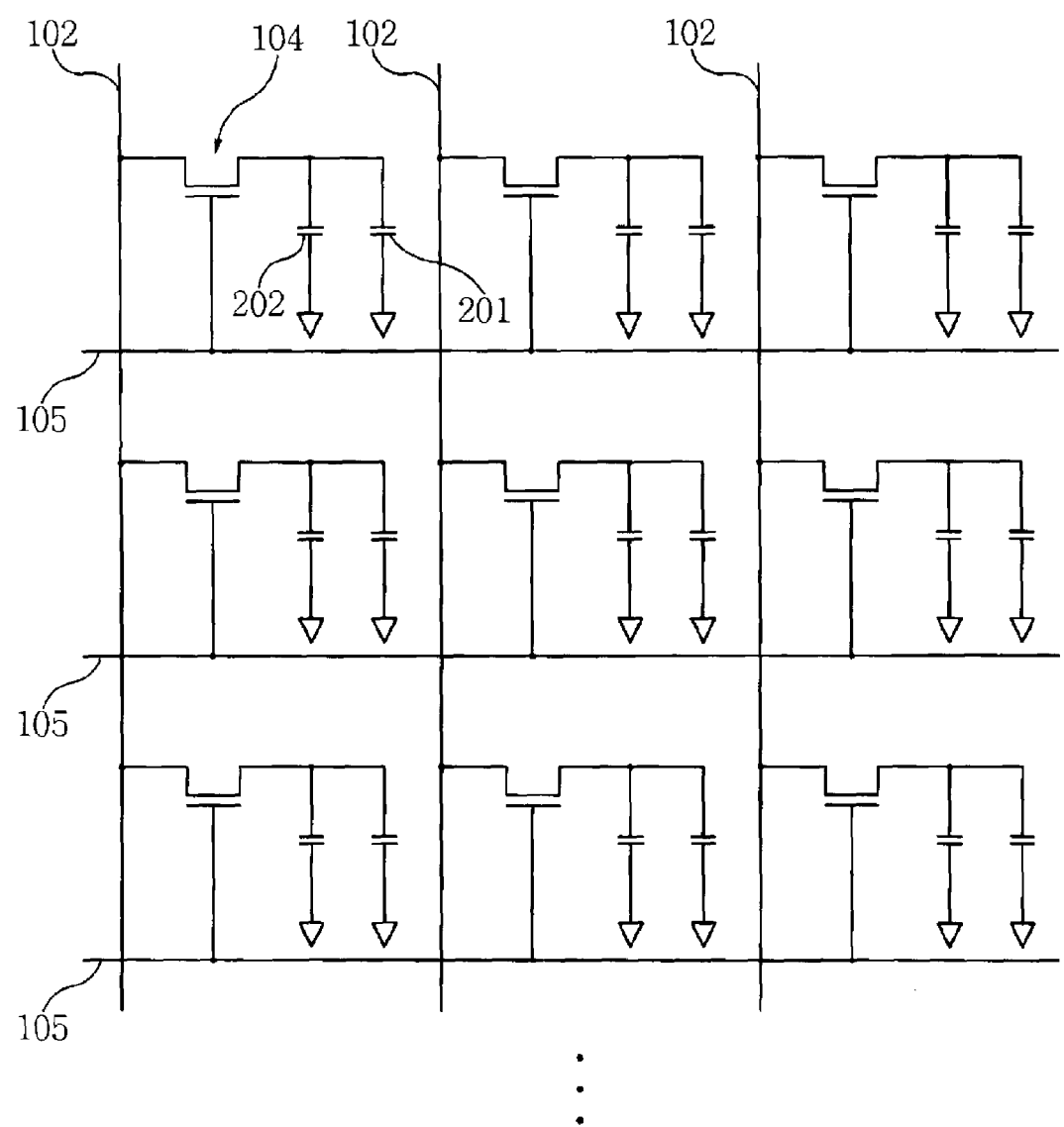
FIG. 1 is a schematic circuit diagram illustrating an array substrate of a liquid crystal display apparatus according to example embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic circuit diagram illustrating an array substrate of a liquid crystal display apparatus according to example embodiment of the present invention.

Referring to FIG. 1, an array substrate includes a plurality of data lines 102 and a plurality of gate lines 105. The data lines 102 are extended in a first direction, and the gate lines 105 are extended in a second direction that is substantially perpendicular to the first direction.

The data lines 102 are formed on a different layer from the gate lines 105. The data lines 102 and the gate lines 105 define a pixel. The pixel includes a thin film transistor 104 as a switching device, a storage capacitor 202 and a liquid crystal capacitor 201 defined by a pixel electrode, a liquid crystal layer and a common electrode.

The thin film transistor 104 includes a gate electrode G that is electrically connected to the gate line 105, a source electrode S that is electrically connected to the data line 102, and a drain electrode D that is electrically connected to the storage capacitor 202 and the liquid crystal capacitor 201.

When a gate voltage is applied to the gate electrode G, the thin film transistor 104 is turned on. When the thin film transistor 104 is turned on, a pixel voltage (or data voltage) of the data line 102 is applied to the liquid crystal capacitor 201 and the storage capacitor 202 through the thin film transistor 104. When the pixel voltage is applied to the liquid crystal capacitor 201, an arrangement of a liquid crystal layer interposed between the common electrode and the pixel electrode is changed to adjust optical transmittance to display images.

The storage capacitor 202 supports the liquid crystal capacitor 201 to maintain the pixel voltage.

The pixel electrode of the liquid crystal capacitor 201 includes an electrically conductive and optical transparent material such as indium tin oxide (ITO), indium zinc oxide (IZO), etc.

Hereinafter, an array substrate according to the present invention will be explained in detail.

Embodiment 1

Figure 2:
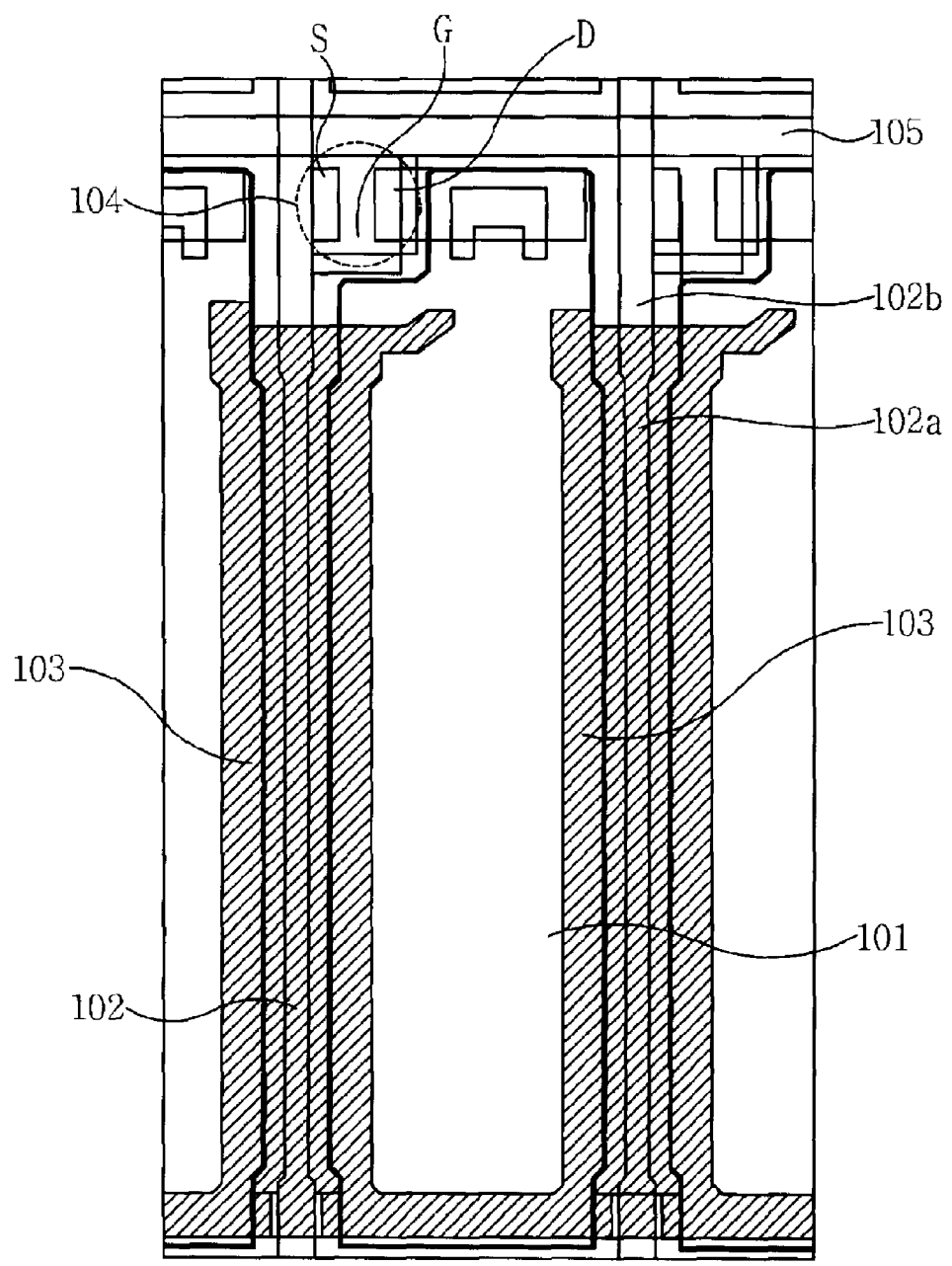
FIG. 2 is a plan view illustrating an array substrate of a liquid crystal display apparatus according to an example embodiment of the present invention.
Figure 3:
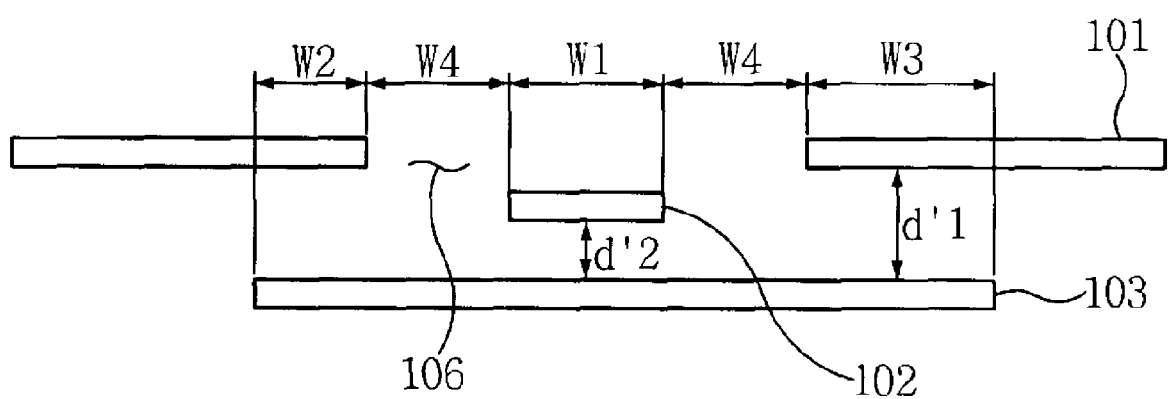
FIG. 3 is a schematic cross-sectional view illustrating the array substrate in FIG. 2.

FIG. 2 is a layout illustrating an array substrate of a liquid crystal display apparatus according to an example embodiment of the present invention, and FIG. 3 is a schematic cross-sectional view illustrating the array substrate in FIG. 2.

Figure 4:
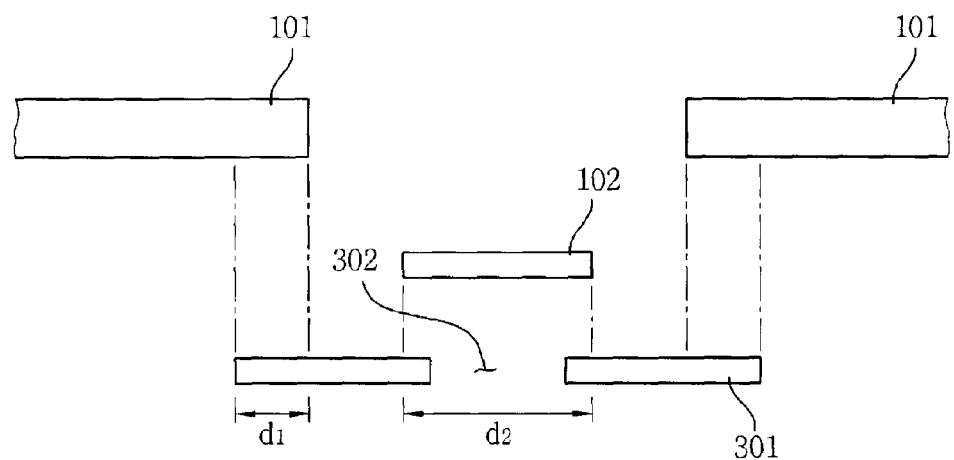
FIG. 4 is a schematic cross-sectional view illustrating an array substrate of a liquid crystal display apparatus according to an example embodiment of the present invention.
Figure 5:
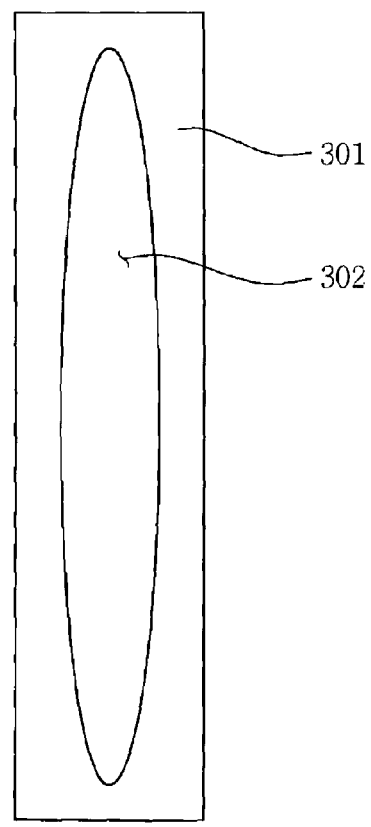
FIG. 5 is a plan view illustrating a light blocking pattern of a liquid crystal display apparatus according to an example embodiment of the present invention in FIG. 4.

Referring to FIGS. 4 and 5, an array substrate according to the present embodiment includes a transparent substrate 108, pixel electrode 101, a thin film transistor 104, a data line 102, a gate line 105 and a light blocking pattern 103.

The pixel electrode 101 is spaced apart from the light blocking pattern 103 by a first distance d'1. A plurality of the pixel electrodes 101 is arranged in a matrix shape. The pixel electrode 101 includes an electrically conductive and optically transparent material such as indium tin oxide (ITO), indium zinc oxide (IZO), etc.

The thin film transistor 104 includes a gate electrode G, a drain electrode D and a source electrode S. The drain electrode D is electrically connected to the pixel electrode 101. The data line 102 is spaced apart from the light blocking pattern 103 by a second distance d'2, and the data line 102 is disposed between the pixel electrodes 101.

The data line 102 is electrically connected to the source electrode S, and the data line 102 applies the pixel voltage to the pixel electrode 101. The data line 102 may include a first portion 102a having a first width W1 and a second portion 102b having a width different from the first width. The first portion 102a may be disposed adjacent to the light blocking pattern 103, and the second portion 102b may be disposed adjacent to the thin film transistor 104. Particularly, the first portion 102a of the data line 102 may be overlapped with the light blocking pattern 103. The width of the second portion 102b may be greater than the first width W1 of the first portion 102a.

For example, the first width W1 of the first portion 102a may be in a range from about 3.0µm to about 4.0µm, and the width of the second portion 102b may be in a range from about 4.5µm to about 5.5µm. Particularly, the first width W1 may be about 3.5 µm, and the width of the second portion 102b may be about 5.0µm. However, when the first width W1 is less than 3.0µm, the data line 102 is electrically disconnected with ease.

According to an example embodiment of the present embodiment, the data line 102 overlaps with the light blocking pattern 103 to induce a parasitic capacitance. Therefore, when the first width W1 of the data line is reduced, the parasitic capacitance is also reduced. Furthermore, the second portion 102b of the data line 102, which has a width greater than the first width of the first portion 102a, is disposed in an area adjacent to the thin film transistor 104, where an electrical disconnection may be easily caused due to step of layers formed in the area. Thus, a structure of the data line 102 may prevent an electrical disconnection. Furthermore, the structure of the data line 102 may improve an aperture ratio of a pixel, and may reduce a power consumption.

The gate electrode G protrudes from the gate line 105, so that the gate electrode G is electrically connected to the gate line 105. An electric signal for turning on the thin film transistor 104 is applied to the gate electrode G of the thin film transistor 104 through the gate line 105.

The light blocking pattern 103 is disposed on the transparent substrate 108, and light blocking pattern may overlap with an area between the pixel electrodes 101. Furthermore, the light blocking pattern 103 overlaps with a first pixel electrode by a second width W2, and the light blocking pattern 103 also overlaps with a second pixel electrode that is adjacent to the first pixel electrode by a third width W3. The light blocking pattern 103 may be formed from substantially the same layer as the gate line 105. For example, the light blocking pattern 103 may be a storage electrode.

For example, the second width W2 may be in a range from about 2.5µm to about 3.5µm. Particularly, the second width W2 may be about 3µm. The third width W3 may be in a range from about 4.5µm to about 5.5µm. Particularly, the third width W3 may be about 5µm.

As shown above, the second and third widths W2 and W3 may be different from each other because liquid crystal molecules are arranged asymmetrically due to pretilt angle of the liquid crystal on the pixel electrode 101.

The light blocking pattern 103 is formed on a substrate on which the data line 102 and the pixel electrode 101 are formed. Therefore, when an opening 106 between the data line 102 and the pixel electrode 101 is blocked by the light blocking pattern 103, a width of margin may be reduced regardless of misalignment between the color filter substrate and the array substrate.

Embodiment 2

FIG. 4 is a schematic cross-sectional view illustrating an array substrate of a liquid crystal display apparatus according to an example embodiment of the present invention.

Referring to FIG. 4, an array substrate includes a pixel electrode 101, a data line 102 and a light blocking pattern 301.

The data line 102 is disposed over the light blocking pattern 301.

The light blocking pattern 301 includes an opening 302. A width of the opening 302 is smaller than a width d2 of the data line 102. When the width of the opening 302 is larger than the width d2 of the data line 102, a light generated from a backlight assembly (not shown) may pass through a space between the opening 302 and the data line 102 to lower a contrast ratio and induce a deterioration of display quality. The light blocking pattern 301 may be overlapped with the pixel electrode 101 by a width of d1. The light blocking pattern 301 may be formed from substantially the same layer as a gate line.

The opening 302 may be extended along a longitudinal direction of the data line 102, or a plurality of openings 302 may be formed along the longitudinal direction of the data line 102.

Figure 6:
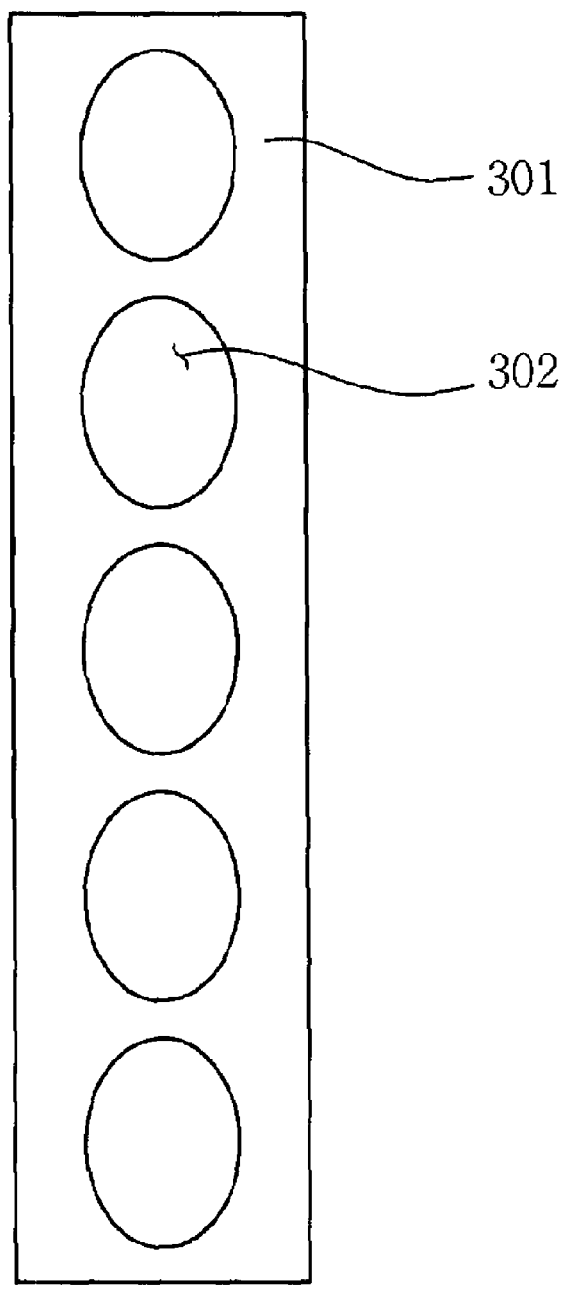
FIG. 6 is a plan view illustrating a light blocking pattern of a liquid crystal display apparatus according to an example embodiment of the present invention.

FIG. 5 is a plan view illustrating a light blocking pattern of a liquid crystal display apparatus according to an example embodiment of the present invention in FIG. 4, and FIG. 6 is a plan view illustrating a light blocking pattern of a liquid crystal display apparatus according to an example embodiment of the present invention.

Figure 7:
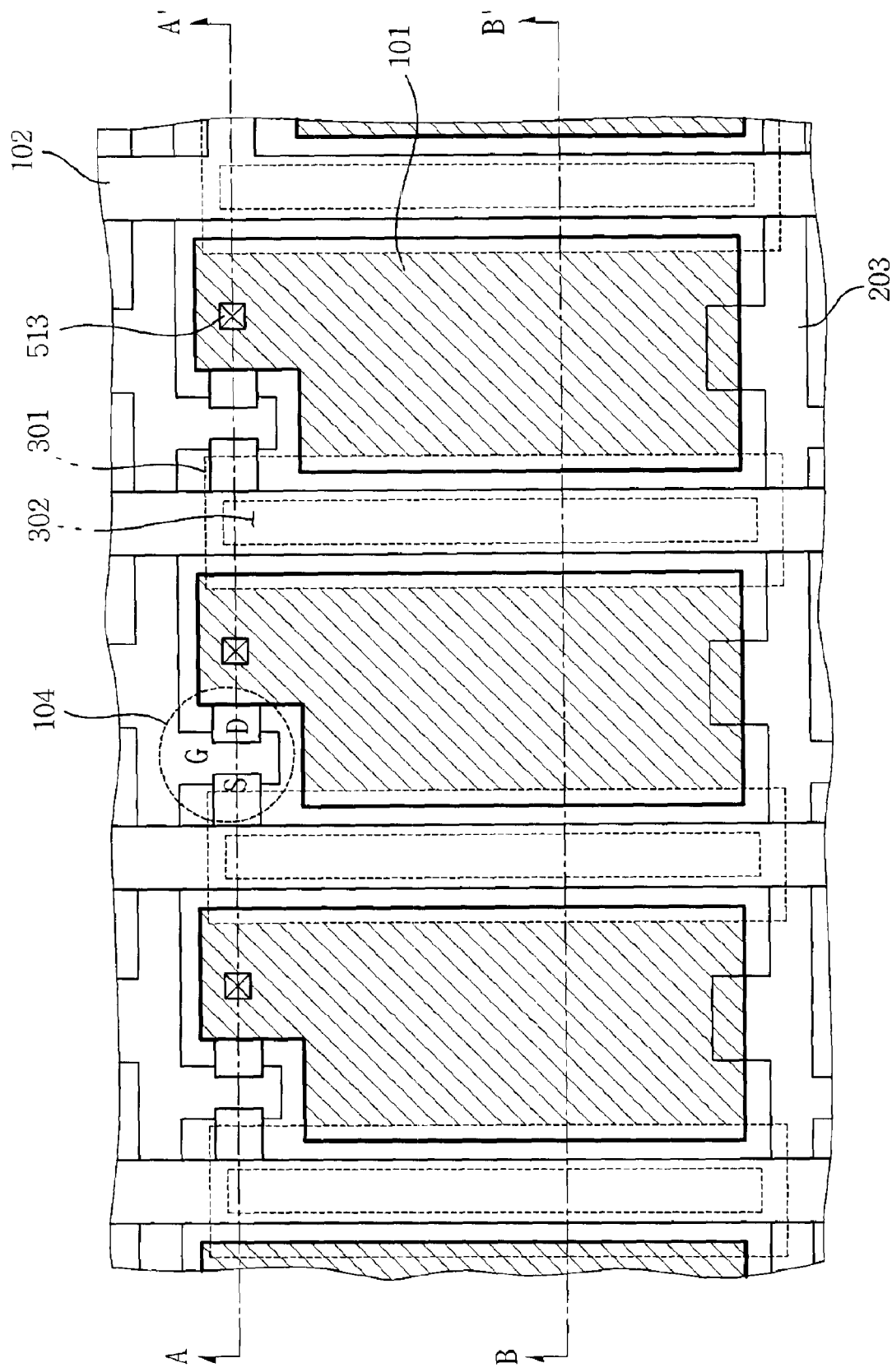
FIG. 7 is a plan view illustrating an array substrate of a liquid crystal display apparatus according to an example embodiment of the present invention.
Figure 8:
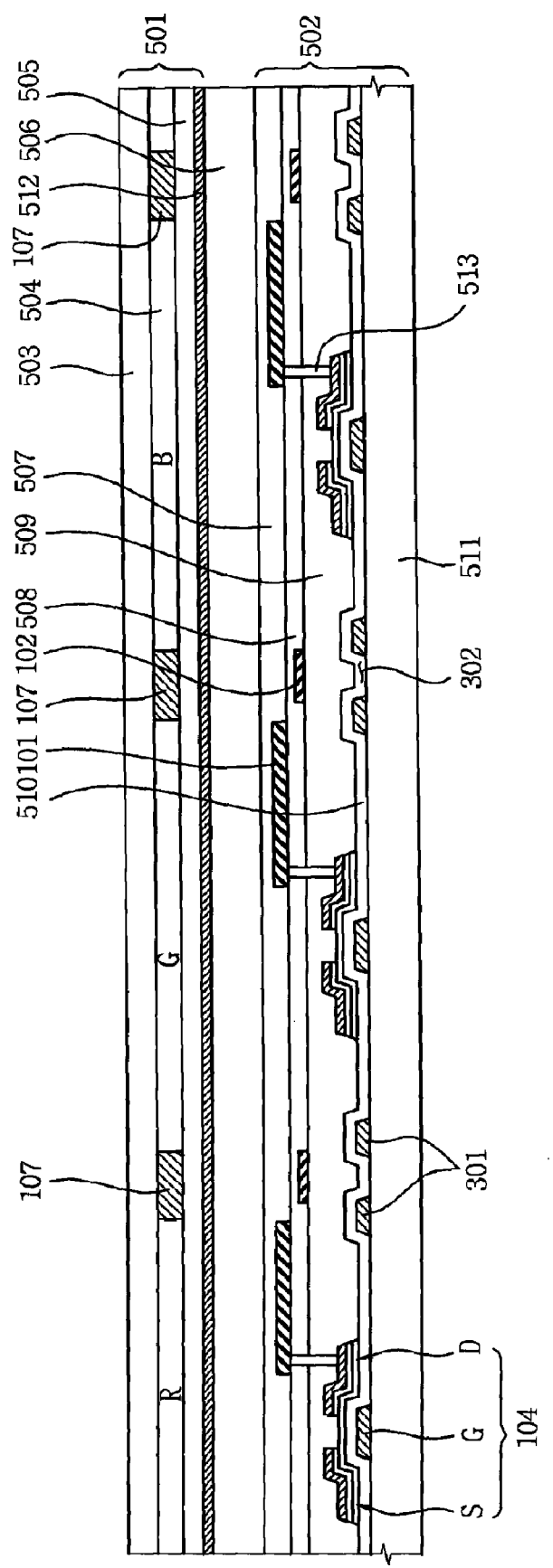
FIG. 8 is a cross-sectional view taken along a line A-A' in FIG. 7.

Referring to FIGS. 7 and 8, an opening 302 may be extended along a longitudinal direction of the data line 102 or a plurality of openings 302 may be formed along the longitudinal direction of the data line 102. As long as the opening 302 reduces an overlapping region between the light blocking pattern 301 and the data line 102, the opening 302 may be formed to have any various shapes.

As described above, when the opening 302 is formed through the light blocking pattern 301, the overlapping region between the light blocking pattern 301 and the data line 102 is reduced to lower a parasitic capacitance between the light blocking pattern 301 and the data line 102. Therefore, power consumption is lowered.

Embodiment of Liquid Crystal Display Apparatus

FIG. 7 is a plan view illustrating an array substrate of a liquid crystal display apparatus according to an example embodiment of the present invention.

Referring to FIG. 7, an array substrate of a liquid crystal display apparatus according to the present embodiment includes a plurality of pixel electrodes 101 and a light blocking pattern 301 disposed under a region between the pixel electrodes 101. The light blocking pattern 301 includes an opening 302. For example, the opening 302 is extended in a longitudinal direction of the light blocking pattern 301. Alternatively, a plurality of openings 302 may be arranged along the longitudinal direction of the light blocking pattern 301. The light blocking pattern 301 may be formed from substantially the same layer as a gate line A data line 102 is disposed over the light blocking pattern 301, and a portion of the data line 102 protrudes from the data line 102 to form a source electrode S of a thin film transistor 104. A portion of the gate line 203 protrudes from a gate line 203 to form a gate electrode G of the thin film transistor 104. A drain electrode D of the thin film transistor 104 is electrically connected to the pixel electrode 101.

Figure 9:
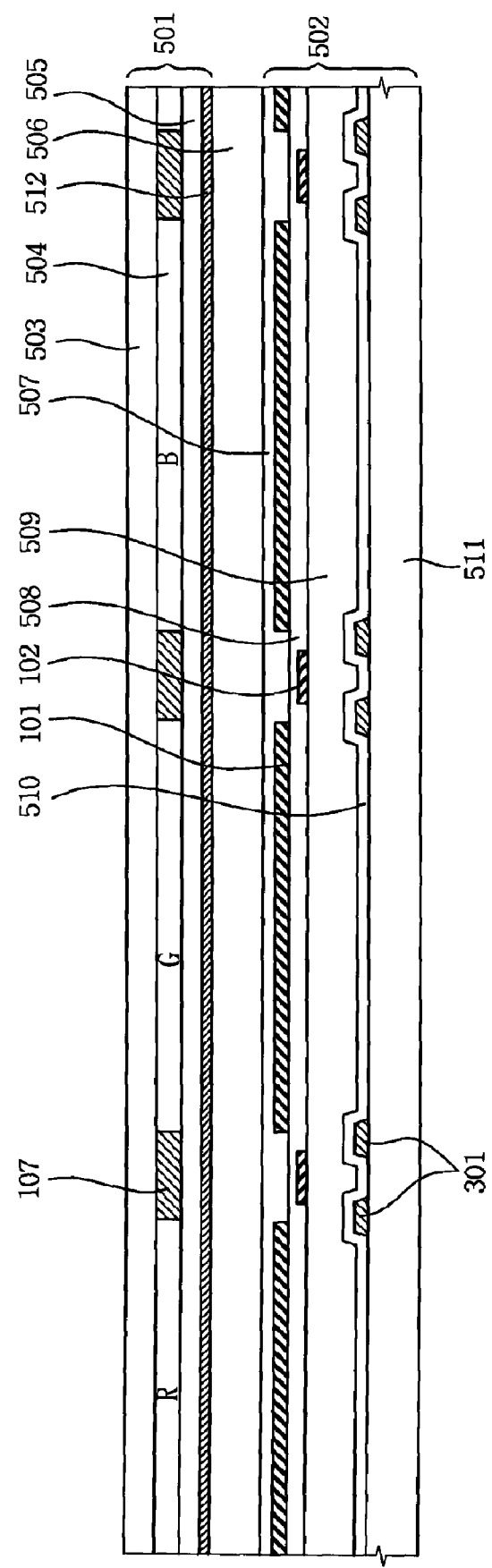
FIG. 9 is a cross-sectional view taken along a line B-B' in FIG. 7.

FIG. 8 is a cross-sectional view taken along a line A-A' in FIG. 7, and FIG. 9 is a cross-sectional view taken along a line B-B' in FIG. 7.

Referring to FIGS. 8 and 9, a liquid crystal display apparatus according to the present embodiment includes an array substrate 502, a color filter substrate 501 and a liquid crystal layer 506 interposed between the array substrate 502 and the color filter substrate 501.

The array substrate 502 includes a first transparent substrate 511.

A gate electrode G and a light blocking pattern 301 are formed on the first transparent substrate 511. The gate electrode G and the light blocking pattern 301 formed on the first transparent substrate 511 may include different materials and may be formed via a different manufacturing process. However, the light blocking pattern 301 and the gate electrode G may include substantially the same material and may be formed via a same manufacturing process. That is, a metal layer is formed on the second transparent substrate 511, and patterned to form the gate electrode G, the light blocking pattern 301 and an opening 302. The opening 302 may be formed after the light blocking pattern 301 is formed.

A gate insulation layer 510 is formed on the second transparent substrate 511 having the light blocking pattern 301 and the gate electrode G. An amorphous silicon layer is formed on the gate insulation layer 510 and patterned to form an active layer. Source and drain electrodes S and D are formed on the active layer.

Then, a first insulation layer 509 is formed, and the data line 102 is formed on the first insulation layer 509.

As described above, the data line 102 is disposed over the light blocking pattern 301 to cover the opening 302 of the light blocking pattern 301. Therefore, a light that is generated from a backlight assembly (not shown) disposed under the array substrate 502 and passes through the opening 302, is blocked by the light blocking pattern 301. Furthermore, an overlapping portion of the light blocking pattern 301 and the data line 102 may be minimized to reduce a parasitic capacitance and power loss, and a cross-talk between the light blocking pattern 301 and the data line 102 is reduced to enhance display quality.

A second insulation layer 508 is formed on the first insulation layer 509 having the data line 102 formed thereon, and a pixel electrode 101 is formed on the second insulation layer 508.

The pixel electrode 101 includes an electrically conductive and optically transparent material such as indium tin oxide (ITO), indium zinc oxide (IZO), etc. The ITO and IZO are also thermally stable, so that an electrode pattern may be easily formed with the ITO or IZO. The pixel electrode 101 is electrically connected to the drain electrode D of the thin film transistor 104.

Then, a third insulation layer 507 may be formed on the second insulation layer 508 having the pixel electrode 101.

The color filter substrate 501 includes a second transparent substrate 503 and a plurality of color filters. The color filters include a red color filter R, a green color filter G and a blue color filter B. Furthermore, the color filter substrate 501 further includes a black matrix 107. The black matrix 107 may have a plurality of openings, and the color filters may be disposed in the openings. The black matrix 107 may be partially overlapped with the color filters. The black matrix 107 may include an opaque material. Examples of the opaque material may include a metal, a pigment, a dye, etc. Each of the color filters faces the pixel electrode 101.

The color filter substrate 501 may be classified into a stripe type, a mosaic type, a triangle type and a four-pixel arrangement type. For example, the stripe type color filter substrate 501 is employed. Alternatively, the color filter substrate may employ other types.

A leveling layer 505 covers and protects the color filters. The leveling layer 505 also levels the color filters, and the leveling layer 505 includes an acryl resin or polyimide resin.

The common electrode 512 is formed on the leveling layer 505. The common electrode 512 includes indium tin oxide (ITO) or indium zinc oxide (IZO).

A reference voltage (or ground voltage) is applied to the common electrode 512 so that electric fields are generated between the common electrode 512 and the pixel electrode 101.

The liquid crystal layer 506 is interposed between the color filter substrate 501 and the array substrate 502. When the electric fields are applied to the liquid crystal layer 506, an arrangement of liquid crystal molecules of the liquid crystal layer 506 is changed to adjust optical transmittance.

That is, an amount of the light that passes through the liquid crystal layer 506 is adjusted according to the arrangement of the liquid crystal molecules.

When a gate driving voltage (not shown) applies a gate voltage to the gate electrode of the thin film transistor 104, the thin film transistor 104 is turned on, and when a data driving circuit (not shown) applies a data voltage to the source electrode of the thin film transistor 104, the data voltage is transferred to the pixel electrode 101 through the thin film transistor 104. Therefore, the arrangement of the liquid crystal molecules is changed to display images.

Hereinbefore, a conventional twisted nematic liquid crystal display apparatus has been explained for an example. However, the present invention may be applied to other type such as a vertical alignment mode liquid crystal display apparatus.

According to the present invention, the light blocking pattern prevents a light leakage. Furthermore, the light blocking pattern is formed on a same substrate as the pixel electrode. Therefore, a margin for misalignment between the color filter substrate and the array substrate is not required to enhance an aperture ratio.

Having described the example embodiments of the present invention and its advantages, it is noted that various changes, substitutions and alterations can be made herein without departing from the spirit and scope of the invention as defined by appended claims.

What is claimed is:

1. A liquid crystal display apparatus comprising:
an array substrate including:
a transparent substrate;
a plurality of pixel electrodes arranged in a matrix shape;
a plurality of switching devices including gate, drain and source electrodes, the drain electrodes of the switching devices being electrically connected to the pixel electrodes, respectively;

a data line disposed under a region between the pixel electrodes, the data line being electrically connected to the source electrode, the data line having a first portion having a first width and a second portion having a second width greater and the first width;

a gate line being electrically connected to the gate electrode to turn on/off the switching devices; and a light blocking pattern disposed on the transparent substrate, the light blocking pattern overlapping at least a portion of the pixel electrodes neighboring each other and at least a portion of the data line, the light blocking pattern being disposed between the data line and the transparent substrate;

a color filter substrate comprising a plurality of color filters; and a liquid crystal layer interposed between the array substrate and the color filter substrate, wherein the first portion is overlapped with the light blocking pattern, and the second portion is adjacent to the switching device and the gate line.

2. The liquid crystal display apparatus of claim 1, wherein the light blocking pattern is a storage electrode.

3. The liquid crystal display apparatus of claim 1, wherein the light blocking pattern is formed from substantially the same layer as the gate line.

4. The liquid crystal display apparatus of claim 1, wherein a portion of the light blocking pattern overlaps with two of the pixel electrodes neighboring each other by second and third widths, respectively, and the second and third widths are different from each other.

5. The array substrate of claim 1, wherein the light blocking pattern comprises an opening having a width that is narrower than a width of the data line.

6. The liquid crystal display apparatus of claim 1, wherein the first width is about 3.0 μm to about 4.0 μm.

7. The liquid crystal display apparatus of claim 1, wherein the second width is about 4.5 μm to about 5.5 μm.

8. The liquid crystal display apparatus of claim 1, wherein the color filter substrate further comprises a black matrix.

9. The liquid crystal display apparatus of claim 1, wherein the black matrix has a plurality of openings in which the color filters are disposed.

10. A liquid crystal display apparatus comprising:
an array substrate including:
a transparent substrate;
a plurality of pixel electrodes arranged in a matrix shape;
a plurality of switching devices including gate, drain and source electrodes, the drain electrodes of the switching devices being electrically connected to the pixel electrodes, respectively;
a data line disposed under a region between the pixel electrodes, the data line being electrically connected to the source electrode;
a gate line being electrically connected to the gate electrode to turn on/off the switching devices; and
a light blocking pattern disposed on the transparent substrate, the light blocking pattern overlapping at least a portion of the pixel electrodes neighboring each other and at least a portion of the data line, the light blocking pattern being disposed between the data line and the transparent substrate;
a color filter substrate comprising a plurality of color filters; and
a liquid crystal layer interposed between the array substrate and the color filter substrate,
wherein a portion of the light blocking pattern overlaps two of the pixel electrodes neighboring each other by second and third widths, respectively, and the second and third widths are different from each other.

11. The liquid crystal display apparatus of claim 10, wherein the light blocking pattern is a storage electrode.

12. The liquid crystal display apparatus of claim 10, wherein the light blocking pattern is formed from substantially the same layer as the gate line.

13. The liquid crystal display apparatus of claim 10, wherein the data line has a first portion having a first width and a second portion having a second width greater than the first width.

14. The liquid crystal display apparatus of claim 13, wherein the first portion is overlaps the light blocking pattern, and the second portion is adjacent to the switching device.

15. A liquid crystal display apparatus comprising:
an array substrate including:
a transparent substrate;
a plurality of pixel electrodes arranged in a matrix shape;
a plurality of switching devices including gate, drain and source electrodes, the drain electrodes of the switching devices being electrically connected to the pixel electrodes, respectively;
a data line disposed under a region between the pixel electrodes, the data line being electrically connected to the source electrode;
a gate line being electrically connected to the gate electrode to turn on/off the switching devices; and
a light blocking pattern disposed on the transparent substrate, the light blocking pattern overlapping at least a portion of the pixel electrodes neighboring each other and at least a portion of the data line, the light blocking pattern being disposed between the data line and the transparent substrate;
a color filter substrate comprising a plurality of color filters; and
a liquid crystal layer interposed between the array substrate and the color filter substrate,
wherein the data line has a first portion having a first width, a second portion having a second width greater than the first width and a third portion having a third width greater than the second width, the third portion having the source electrodes,
wherein the first portion is overlapped with the light blocking pattern,
wherein the second portion is adjacent to the switching device.

16. The liquid crystal display apparatus of claim 15, wherein the light blocking pattern is a storage electrode.

17. The liquid crystal display apparatus of claim 15, wherein the light blocking pattern is formed from substantially the same layer as the gate line.

18. The liquid crystal display apparatus of claim 15, wherein a portion of the light blocking pattern overlaps two of the pixel electrodes neighboring each other by second and third widths, respectively, and the second and third widths are different from each other.

* * * * *